(12) United States Patent
Takahashi et al.

(10) Patent No.: US 10,184,549 B2
(45) Date of Patent: Jan. 22, 2019

(54) BELT TRANSMISSION SYSTEM

(71) Applicant: BANDO CHEMICAL INDUSTRIES, LTD., Kobe (JP)

(72) Inventors: Hiroyoshi Takahashi, Kobe (JP); Takehiro Hayashi, Kobe (JP); Takeshi Saito, Kobe (JP); Keisuke Takenaka, Kobe (JP)

(73) Assignee: Bando Chemical Industries, Ltd., Kobe-shi, Hyogo (JP)

( * ) Notice: Subject to any disclaimer, the term of this patent is extended or adjusted under 35 U.S.C. 154(b) by 0 days.

(21) Appl. No.: 15/804,853

(22) Filed: Nov. 6, 2017

(65) Prior Publication Data

US 2018/0058551 A1    Mar. 1, 2018

Related U.S. Application Data

(63) Continuation of application No. PCT/JP2016/002143, filed on Apr. 21, 2016.

(30) Foreign Application Priority Data

May 8, 2015    (JP) .................................. 2015-095991

(51) Int. Cl.
*F16H 7/12* (2006.01)
*F02B 67/06* (2006.01)
*F16H 7/08* (2006.01)

(52) U.S. Cl.
CPC ........... *F16H 7/1281* (2013.01); *F02B 67/06* (2013.01); *F16H 7/12* (2013.01); *F16H 2007/0865* (2013.01); *F16H 2007/0874* (2013.01); *F16H 2007/0893* (2013.01)

(58) Field of Classification Search
CPC ........ F16H 7/1281; F16H 7/12; F16H 7/1263; F16H 2007/0806; F16H 2007/0808; F16H 2007/081; F16H 2007/0842; F16H 2007/0865; F16H 2007/0874; F16H 2007/0893; F02B 67/06; F02N 11/04
See application file for complete search history.

(56) References Cited

U.S. PATENT DOCUMENTS

| | | | |
|---|---|---|---|
| 6,896,632 B2 * | 5/2005 | Redmond | F16H 7/1281 101/117 |
| 2001/0007839 A1 | 7/2001 | Guhr | |
| 2002/0039944 A1 * | 4/2002 | Ali | F16H 7/1209 474/135 |

(Continued)

FOREIGN PATENT DOCUMENTS

| | | |
|---|---|---|
| DE | 102008058969 A1 | 5/2010 |
| JP | 2001-059555 A | 3/2001 |

(Continued)

*Primary Examiner* — Michael R Mansen
*Assistant Examiner* — Robert T Reese
(74) *Attorney, Agent, or Firm* — Knobbe, Martens, Olson & Bear, LLP

(57) ABSTRACT

A belt transmission system includes a first pulley, a second pulley, and an automatic tensioner including a first tension pulley, a fixed member, an arm, and a second tension pulley. The arm is swingable about an axis of the fixed member. When the first or second pulley serves as a driving pulley, a torque at one of the first and second tension pulleys located on a slack side at a maximum torque is higher than a torque of the other one located on a tight side.

6 Claims, 16 Drawing Sheets

(56) References Cited

U.S. PATENT DOCUMENTS

| | | | |
|---|---|---|---|
| 2003/0153420 A1 | 8/2003 | Rogers | |
| 2003/0153421 A1* | 8/2003 | Liu | F16H 7/1209 |
| | | | 474/134 |
| 2005/0181901 A1* | 8/2005 | Shin | F16H 7/1218 |
| | | | 474/134 |
| 2010/0016106 A1* | 1/2010 | Minemura | B41J 3/4071 |
| | | | 474/113 |
| 2014/0357436 A1* | 12/2014 | Hara | F16H 7/12 |
| | | | 474/113 |
| 2015/0219189 A1* | 8/2015 | Serkh | F16H 7/1218 |
| | | | 474/112 |
| 2017/0037940 A1* | 2/2017 | Serkh | F16H 7/1281 |
| 2017/0122414 A1* | 5/2017 | Takenaka | F16H 7/12 |

FOREIGN PATENT DOCUMENTS

| | | |
|---|---|---|
| JP | 2001-193807 A | 7/2001 |
| JP | 2004-068973 A | 3/2004 |

\* cited by examiner $$P = 2 \times Tb \times \sin(\theta/2)$$
$$m = L \times \sin(\alpha)$$
$$Tr = P \times m$$
$$Tr = 2 \times Tb \times L \times \sin(\theta/2) \times \sin(\alpha)$$

$L$ : LENGTH OF ARM (mm)
$Tb$ : TENSION OF BELT (N)
$\theta$ : WRAPPING ANGLE (DEGREE)
$\alpha$ : HUB LOAD ANGLE (DEGREE)
$P$ : HUB LOAD
$m$ : MOMENT ARM LENGTH $$Tr = 2 \times Tb \times \left[ L_1 \times \sin\left(\theta_1/2\right) \times \sin(\alpha_1) + L_2 \times \sin\left(\theta_2/2\right) \times \sin(\alpha_2) \right]$$

T/S=1.00

T/S=3.27

BELT TRANSMISSION SYSTEM

CROSS-REFERENCE TO RELATED APPLICATIONS

This is a continuation of International Application No. PCT/JP2016/002143 filed on Apr. 21, 2016, which claims priority to Japanese Patent Application No. 2015-095991 filed on May 8, 2015. The entire disclosures of these applications are hereby incorporated by reference.

BACKGROUND

The present disclosure relates to a belt transmission system.

Two automatic tensioners (hereinafter simply referred to as an AT or ATs) are mounted in some belt transmission systems including an internal-combustion engine, a generator, and a starter motor. In particular, one of two ATs, which is located between a crank pulley and a generator, needs to exhibit high damping characteristics at the start of the generator and the starter motor. Hydraulic ATs are thus increasingly used.

SUMMARY

However, hydraulic ATs are relatively more expensive than other types of ATs. A belt transmission system using two ATs requires another AT, which increases the manufacturing costs.

On the other hand, at the start of the generator and the starter motor or in ordinary use, a belt may slip to cause a start-up failure or abnormal noise.

To address the problem, Japanese Unexamined Patent Publication No. 2001-193807 discloses a belt transmission system including an internal-combustion engine and a generator/starter motor. In this document, a first tension roller (pulley) R1 is located on the slack side of a pulley of the generator/starter, and a second tension roller (pulley) R2 is located on the tight side. A spring is also provided to apply a tension required by one of the tension rollers.

United States Patent Publication No. 2003/0153420 discloses an automatic tensioner including two arms with a single pivot interposed therebetween, and tension pulleys, each being connected to one of the arms.

Japanese Unexamined Patent Publication No. 2004-068973 discloses an automatic tensioner including a round bar-like spindle located in a pivot position, and first and second arms supported swingably by the spindle. The layout of this automatic tensioner is designed to always keep a hub load angle at 170° or smaller so that the tension of the belt is not lower than zero. This reduces slips of the belt and abnormal noise.

However, typical belt transmission systems including the automatic tensioners described in Patent Documents 1 to 3 focus too much on reduction in slips of the belt or abnormal noise. This may cause an excessive increase in the tensions of the belt on both the tight and slack sides of a single pulley. An excessive increase in the tensions of the belt may shorten the lifetime of the belt or fuel efficiency. An excessive increase in the tension of the belt on both the tight and slack sides of the pulley increases the force applied to the axis of the pulley, which may shorten the lifetime of the pulley. Developments of belt transmission systems, which include a long-lasting belt and long-lasting pulleys and reduce slips of the belt and abnormal noise, are desired.

Finding a solution to the problem is important for automatic tensioners used not only for belt transmission systems including a crank pulley and a generator/starter pulley but also for systems transmitting any kind of power.

It is an objective of the present disclosure to increase the lifetimes of a belt and pulleys and fuel efficiency, and efficiently reduce slips and abnormal noise in a belt transmission system, in which pulleys such as a crank pulley and a generator/starter pulley alternately serve as a driving pulley and a driven pulley.

A belt transmission system according to an embodiment of the present disclosure includes a first pulley configured to transmit first power; a second pulley configured to transmit second power; an endless belt wrapped around the first and second pulleys and configured to run therebetween; an automatic tensioner including a first tension pulley configured to apply a tension to a portion of the belt located between the first and second pulleys on a slack side of the first pulley in a normal operation, a fixed member, an arm located on the fixed member to be swingable about an axis of the fixed member, and a second tension pulley configured to apply a tension to another portion of the belt located between the first and second pulleys on a tight side of the first pulley in the normal operation. One of the first and second tension pulleys located on the slack side at a maximum torque provides a greater torque than the other of the first and second tension pulleys located on the tight side, when the first or second pulley serves as a driving pulley.

A belt transmission system and a method of designing the system according to an embodiment of the present disclosure reduce the tension of a belt within a required range, while reducing slips and abnormal noise.

BRIEF DESCRIPTION OF THE DRAWINGS

FIG. 7A illustrates force applied while the automatic tensioner stops. FIG. 7B illustrates force applied while the automatic tensioner operates.

DETAILED DESCRIPTION

Embodiment

Configuration of Automatic Tensioner

Figure 1:
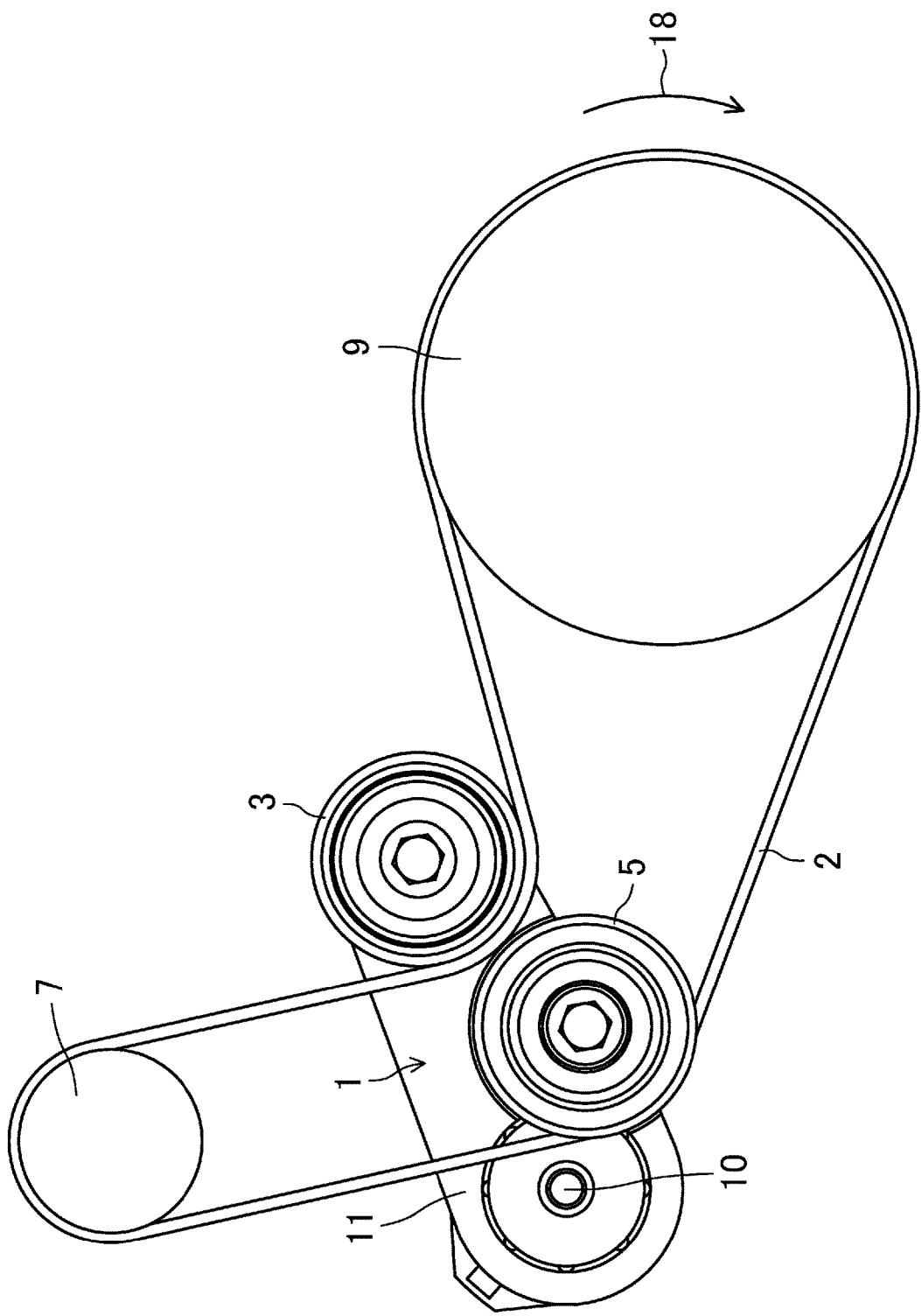
FIG. 1 illustrates a schematic configuration of a belt transmission system including an automatic tensioner according to the present disclosure.
Figure 2:
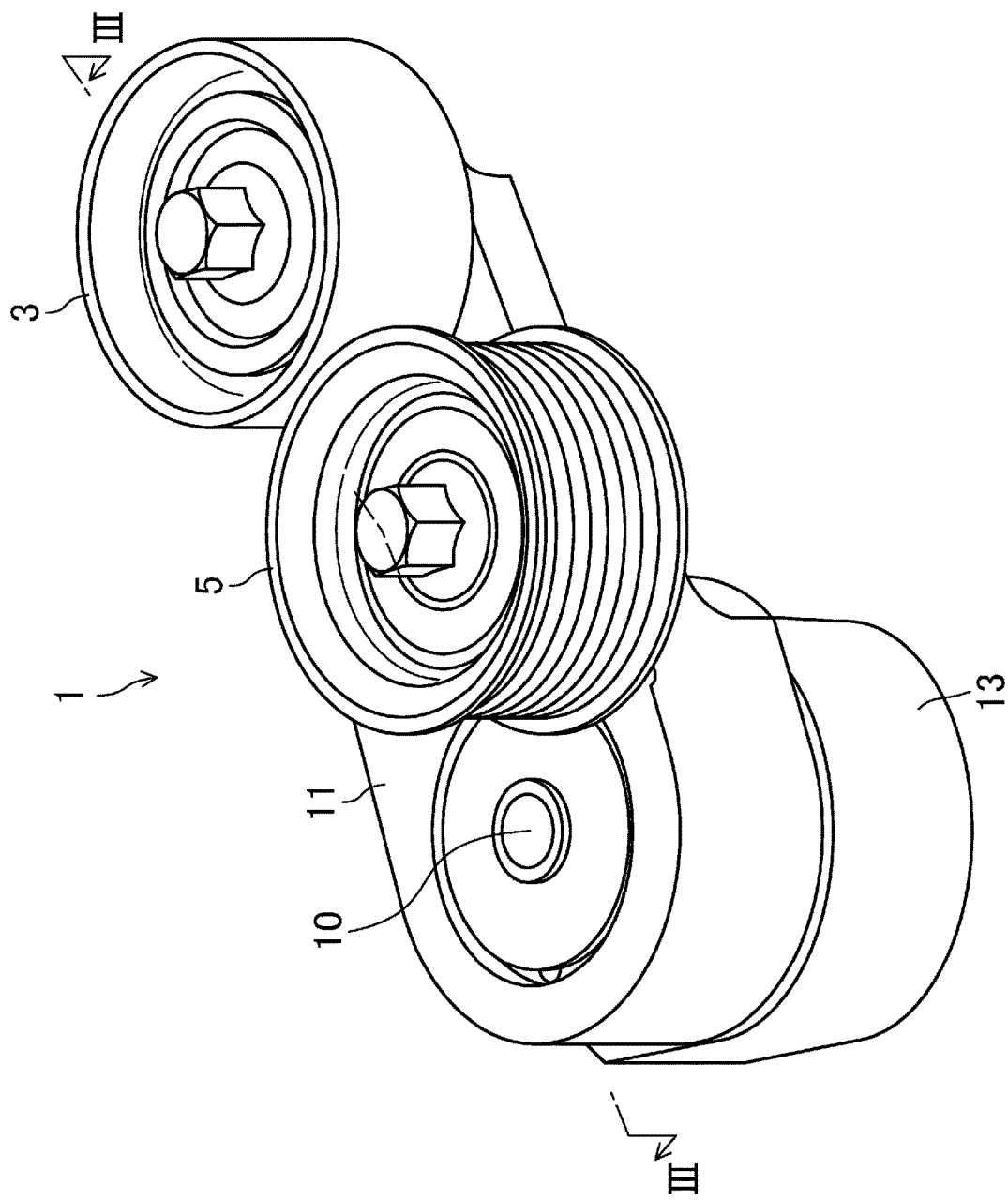
FIG. 2 is a perspective view of the automatic tensioner according to the present disclosure.
Figure 3:
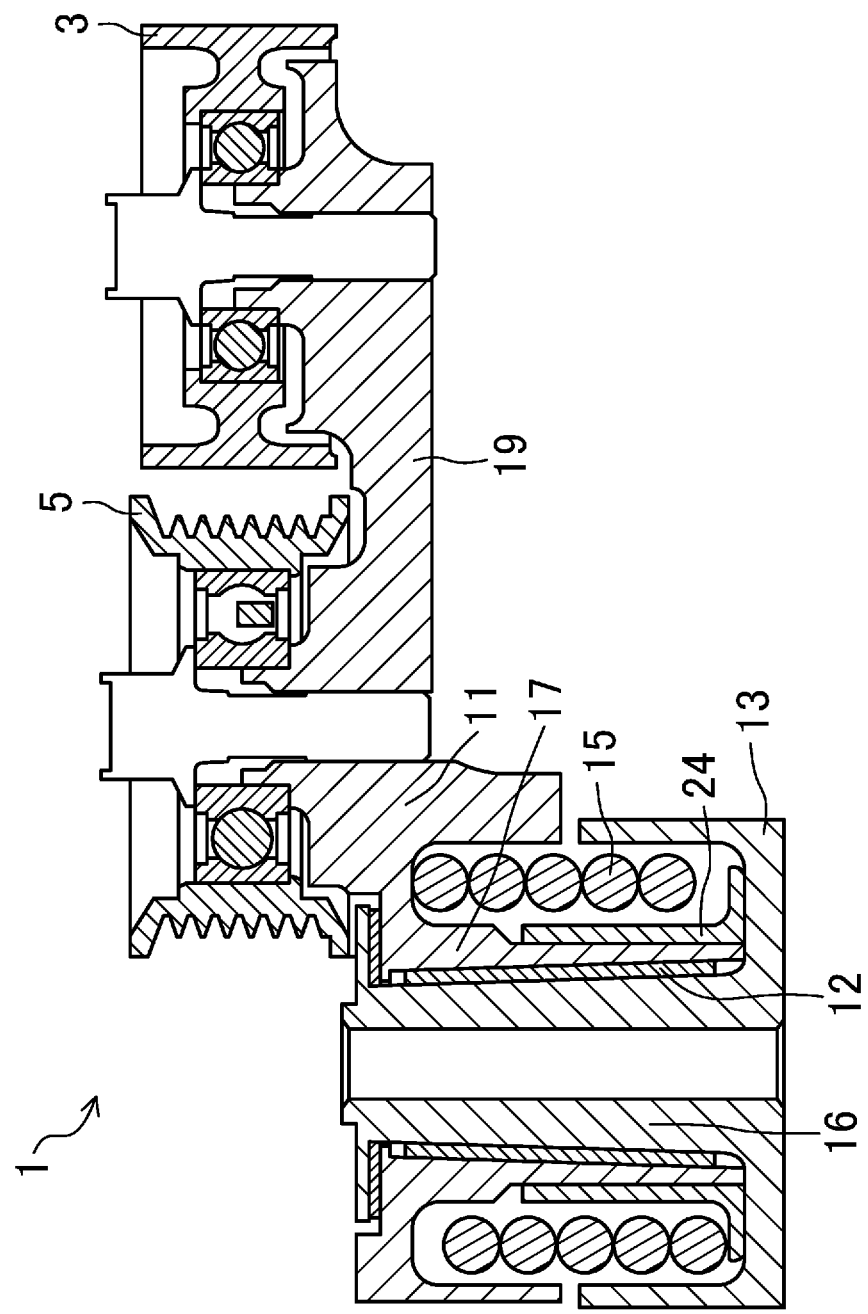
FIG. 3 is a cross-sectional view of the automatic tensioner according to the present disclosure taken along the line (see FIG. 2).
Figure 4:
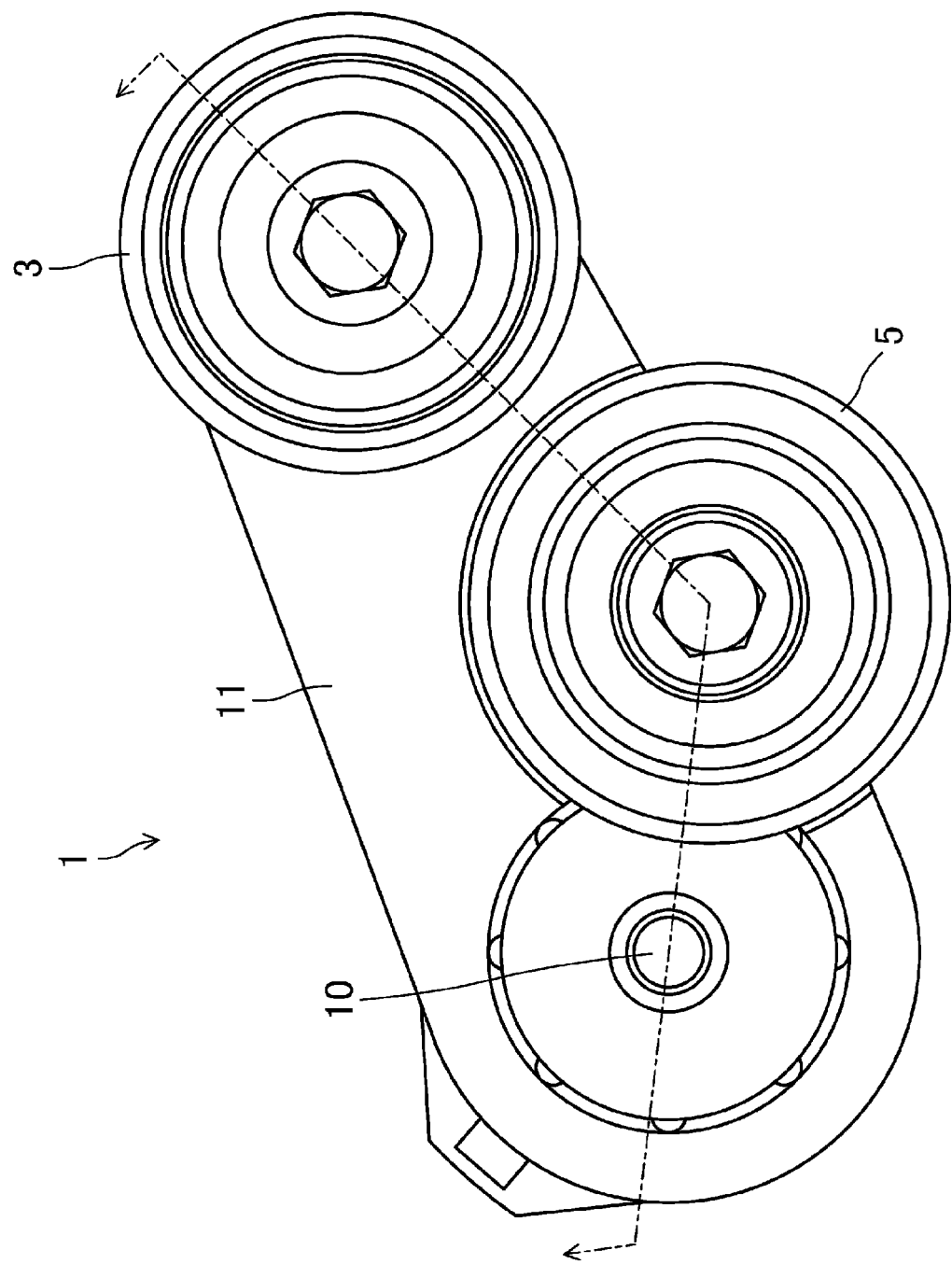
FIG. 4 is a plan view of the automatic tensioner according to the present disclosure seen from a tension pulley.
Figure 5:
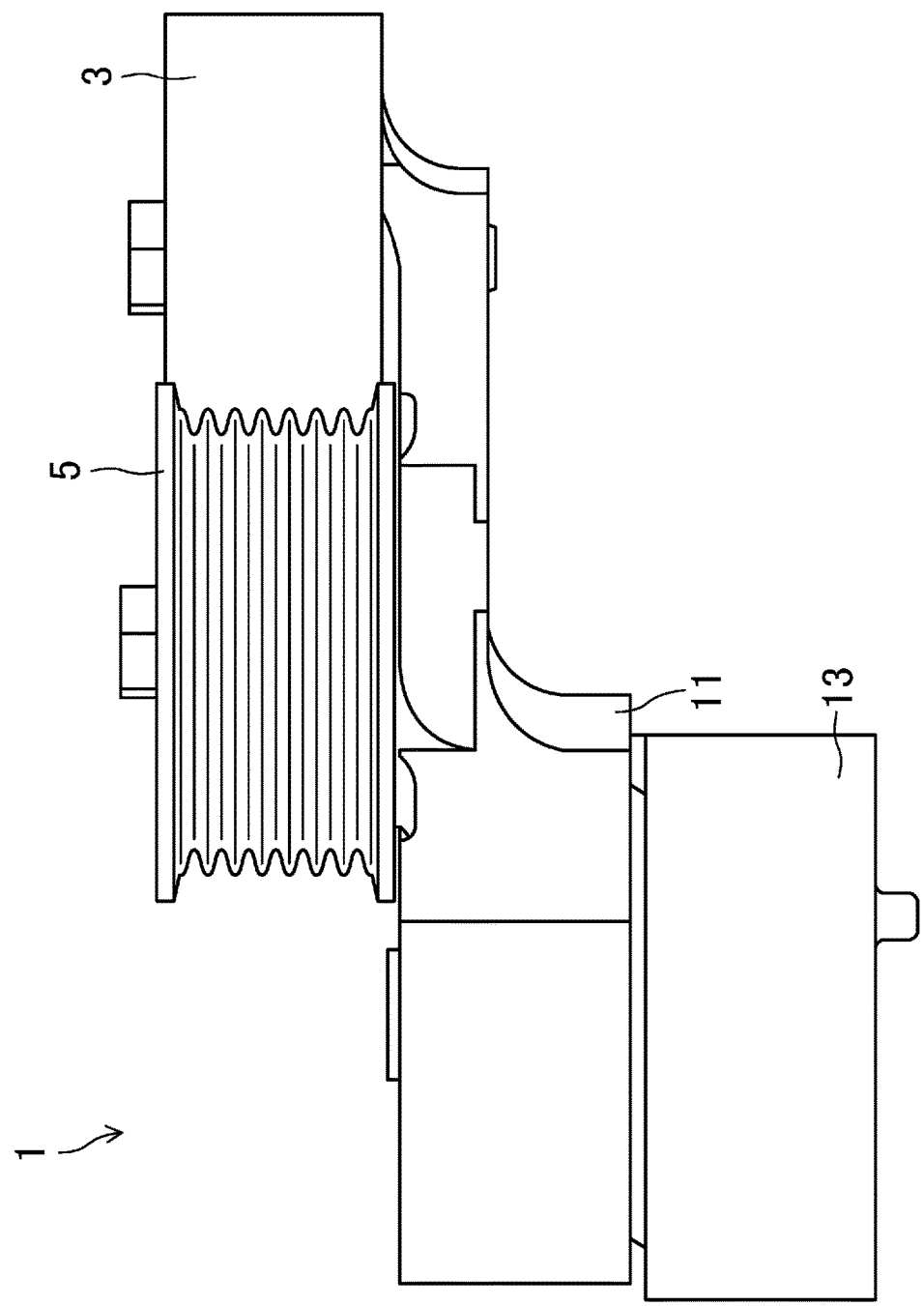
FIG. 5 is a side view of the automatic tensioner according to the present disclosure.

FIG. 1 illustrates a belt transmission system including an automatic tensioner 1 according to an embodiment of the present disclosure. FIG. 2 is a perspective view of the automatic tensioner 1 of the belt transmission system according to this embodiment. FIG. 3 is a cross-sectional view of the automatic tensioner 1 taken along the line of FIG. 2. FIG. 4 is a plan view of the automatic tensioner 1 according to this embodiment as viewed from a tension pulley. FIG. 5 is a side view of the automatic tensioner 1 according to this embodiment.

As shown in FIG. 1, the belt transmission system according to this embodiment transmits, as an example, power generated by an internal-combustion engine and a generator/starter motor. In this description, a "generator/starter motor" is an integration of a generator and a starter motor. The belt transmission system includes a crank pulley (i.e., a first pulley) 9, a generator/starter pulley (i.e., a second pulley) 7, an endless belt 2, and the automatic tensioner 1. The crank pulley 9 transmits power generated by the internal-combustion engine. The generator/starter pulley 7 transmits power generated by the generator/starter motor. The belt 2 is wrapped around the crank pulley 9 and the generator/starter pulley 7 and configured to run therebetween. The automatic tensioner 1 applies a predetermined tension to the belt 2.

How to apply the tension to the belt 2, and how the automatic tensioner 1 obtains damping characteristics are not particularly limited. An example where the automatic tensioner 1 includes a helical torsion spring will be described.

As shown in FIGS. 2 to 5, the automatic tensioner 1 includes a fixed member 13, an arm 11, a first tension pulley 5, and a second tension pulley 3. The fixed member 13 is fixed, for example, to an engine of a vehicle and has a cylindrical part. The arm 11 is provided on the fixed member 13 swingable about the axis of the fixed member 13. The first and second tension pulleys 5 and 3 are supported on and fixed to the arm 11. In this embodiment, the first tension pulley 5 is closer to the center 10 of swing (i.e., the pivot) of the arm 11 than the second tension pulley 3 is. However, the present disclosure is not limited thereto, as will be described later.

The second tension pulley 3 applies a tension to a portion of the belt 2 located between the crank pulley 9 and the generator/starter pulley 7 on the tight side of the crank pulley 9 in a normal operation. The first tension pulley 5 applies a tension to another portion of the belt 2 located between the crank pulley 9 and the generator/starter pulley 7 on the slack side of the crank pulley 9 in the normal operation. This configuration adjusts the tension of the belt 2 within a proper range.

How the fixed member 13 supports the arm 11 is not particularly limited. For example, each of the arm 11 and the fixed member 13 may have a cylindrical part. The cylindrical parts of the arm 11 and the fixed member 13 may have different diameters so that one of the cylindrical parts is fitted in the other cylindrical part.

In the example shown in FIGS. 2 to 5, the arm 11 includes a cylindrical shaft 17 and an extension 19. The shaft 17 is fitted on a cylindrical part (i.e., a spindle) 16 of the fixed member 13. The extension 19 extends horizontally from the shaft 17 (perpendicular to the axes of the shaft 17 and the fixed member 13). The first tension pulley 5 and the second tension pulley 3 are fixed to the extension 19 by fixtures such as nuts and screws.

In the automatic tensioner 1, for example, a bush 12 is provided between the cylindrical part 16 of the fixed member 13 and the shaft 17 of the arm 11, which is fitted on the cylindrical part 16. A helical torsion spring 15 is provided outside the cylindrical part 16 of the fixed member 13 and the shaft 17. One end of the helical torsion spring 15 is engaged with (i.e., connected to) the arm 11. The other end is engaged with (i.e., connected to) the fixed member 13. The helical torsion spring 15 has an axis, which approximately agrees with the axis of the shaft 17. The arm 11 is biased in its swing direction to apply a tension to the belt 2 through the first and second tension pulleys 5 and 3. The helical torsion spring 15 is preferably made of, for example, metal or a metal compound such as silicon chromium copper.

The belt 2 may be, for example, a flat belt, a toothed belt, a cogged belt, or a V-belt. A surface(s) of the belt 2, on which the first and second tension pulleys 5 and 3 abuts on, is/are not particularly limited. For example, where the belt 2 is a flat belt or a toothed belt, the first tension pulley 5 may abut on one of the outer and inner circumferential surfaces of the belt 2, and the second tension pulley 3 may abut on the other one of the outer and inner circumferential surfaces of the belt 2. Alternatively, the first and second tension pulleys 5 and 3 may abut on a side surface of the belt 2.

The fixed member 13 is fixed to, for example, an engine body by fixtures such as bolts. The fixed member 13 and the arm 11 may be made of known metal, and formed, for example, using a die.

In the automatic tensioner 1 according to this embodiment, the direction in which the first tension pulley 5 is turned by the force received from the belt 2 may be the same or different from the direction in which the second tension pulley 3 is turned by the force received from the belt 2.

When the first tension pulley 5 turns in the direction in which the tension of the belt 2 increases, the second tension pulley 3 may also turn in this direction. When the first tension pulley 5 turns in the direction in which the tension of the belt 2 decreases, the second tension pulley 3 may also turn in this direction. The automatic tensioner 1 may also be designed such that one of the first and second tension pulleys 5 and 3 increases the tension of the belt 2, whereas the other reduces the tension of the belt 2.

The belt transmission system according to this embodiment is, as will be described later in detail, designed to reduce an excessive tension applied to the belt 2 in view of a T/S ratio. The T/S ratio herein is the torque sharing ratio of the part of the arm connected to the first tension pulley 5 (the part of the arm 11 from the center 10 of swing to the center of the first tension pulley 5 in the example of FIG. 1) to the part of the arm connected to the second tension pulley 3 (the part of the arm 11 from the center 10 of swing to the center of the second tension pulley 3 in the example of FIG. 1). A change in the T/S ratio changes the sensitivity of the tension with respect to the torque, and the relation in a torque-span tension diagram (see FIG. 8, which will be described later).

In the belt transmission system according to this embodiment, when the crank pulley 9 or the generator/starter pulley 7 serves as a driving pulley, one of the first and second tension pulleys 5 and 3 located on the slack side at a maximum torque provides a greater torque than the other tension pulley located on the tight side.

The T/S ratio may be set at at least higher than 1. In one preferred embodiment, the ratio of the T/S ratio to an optimum value obtained by a method, which will be described later, falls within a predetermined range. This configuration reduces slips of the belt 2, and the tension of the belt within the range required for an apparatus to which the belt is applied. This extends the lifetime of the belt, and reduces the force applied to the axis of the pulley, which leads to extension of the lifetime of the pulley. In addition, the belt transmission system according to this embodiment has an increased fuel efficiency.

In the automatic tensioner 1 according to this embodiment, at a start and during an operation (during a normal operation) of the engine, the crank pulley 9 serves as the driving pulley and the belt 2 rotates, for example, clockwise. Then, the first tension pulley 5 comes into contact with a part of the belt 2 on the slack side, whereas the second tension pulley 3 comes into contact with a part of the belt 2 on the tight side. At this time, the biasing force of the helical torsion spring 15 of the automatic tensioner 1 is applied to the tight side of the belt mainly via the second tension pulley 3. On the other hand, the biasing force of the helical torsion spring 15 applied to the belt 2 is smaller on the slack side of the belt than on the tight side.

At a start and during an operation of the generator/starter motor, the generator/starter pulley 7 operates and the belt 2 rotates clockwise. In this case, the first tension pulley 5 comes into contact with a part of the belt 2 on the tight side, whereas the second tension pulley 3 comes into contact with a part of the belt 2 on the slack side. At this time, the biasing force of the helical torsion spring 15 of the automatic tensioner 1 is mainly applied to the tight side of the belt via the first tension pulley 5.

As described above, in the belt transmission system according to this embodiment, the biasing force of the helical torsion spring 15 of the automatic tensioner 1 is balanced and distributed between the tight and slack sides of the belt in accordance with the conditions of the belt system.

In this configuration, the arm 11 swings within a smaller range than in a typical belt transmission system, thereby efficiently reducing slips of the belt.

In the belt transmission system according to this embodiment, the two tension pulleys provided for the single automatic tensioner 1 apply tensions to the belt 2. Thus, greater torques can be set with low tensions as compared to an automatic tensioner including a single tension pulley. Even if the pulleys require great torques at a moment, needed tensions can be hold relatively easily.

The automatic tensioner 1 according to this embodiment can be fabricated by combining members which have been often used. In addition, there is no need to change the designs of the belt 2, the crank pulley 9, the generator/starter pulley 7, and the other elements. The belt transmission system according to this embodiment can be thus employed at low costs.

The automatic tensioner 1 preferably includes a member for providing unidirectional damping characteristics. Damping force may be obtained by friction between a slidable member and the arm 11 or the fixed member 13. In the example shown in FIG. 3, a sliding member 24 made of, for example, resin, and sliding on a part of the arm 11 is provided inside and below the helical torsion spring 15.

If the tension of the belt 2 being in contact with the first and second tension pulleys 5 and 3 decreases, a torsional torque applied in the direction in which the helical torsion spring 15 extends turns the arm 11 in the direction in which the arm 11 presses the belt 2. On the other hand, if the tension of the belt 2 increases, the reaction force of the belt presses the first and second tension pulleys 5 and 3 to turn the arm 11 in a direction opposite to the pressing direction of the belt, thereby reducing an increase in the tension of the belt.

A part of the helical torsion spring 15 is always pressed inward in a radial direction by the reaction force of the torsional torque of the helical torsion spring 15. When the arm 11 turns in the pressing direction of the belt, that is, when the helical torsion spring 15 extends, the reaction force of the torsional torque decreases accordingly, and thus the damping force also decreases. As a result, the arm 11 turns quickly. On the other hand, when the arm 11 turns opposite to the pressing direction of the belt, that is, when the helical torsion spring 15 contracts, the reaction force of the torsional torque increases accordingly, and thus the damping force also increases.

In this manner, since the automatic tensioner 1 includes the member providing the unidirectional damping characteristics, the arm 11 swings within a small range. This configuration increases a dynamic tension applied to the belt 2.

In the automatic tensioner 1 according to this embodiment, the single arm 11 is provided for the first and second tension pulleys 5 and 3. With the use of the automatic tensioner 1 according to this embodiment, design flexibility increases as compared to the case where an automatic tensioner including a single tension pulley is provided on each of the tight and slack sides of the generator/starter pulley 7.

Optimization of T/S Ratio

Figure 6:
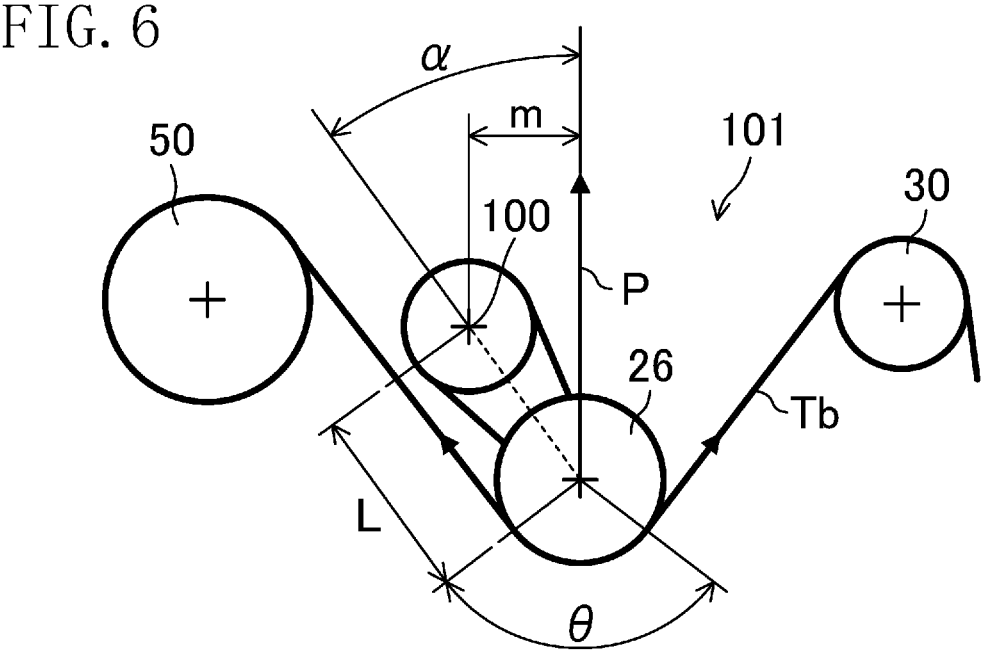
FIG. 6 illustrates various kinds of force applied in the case where a typical automatic tensioner is used for a belt transmission system.
Figure 7A:
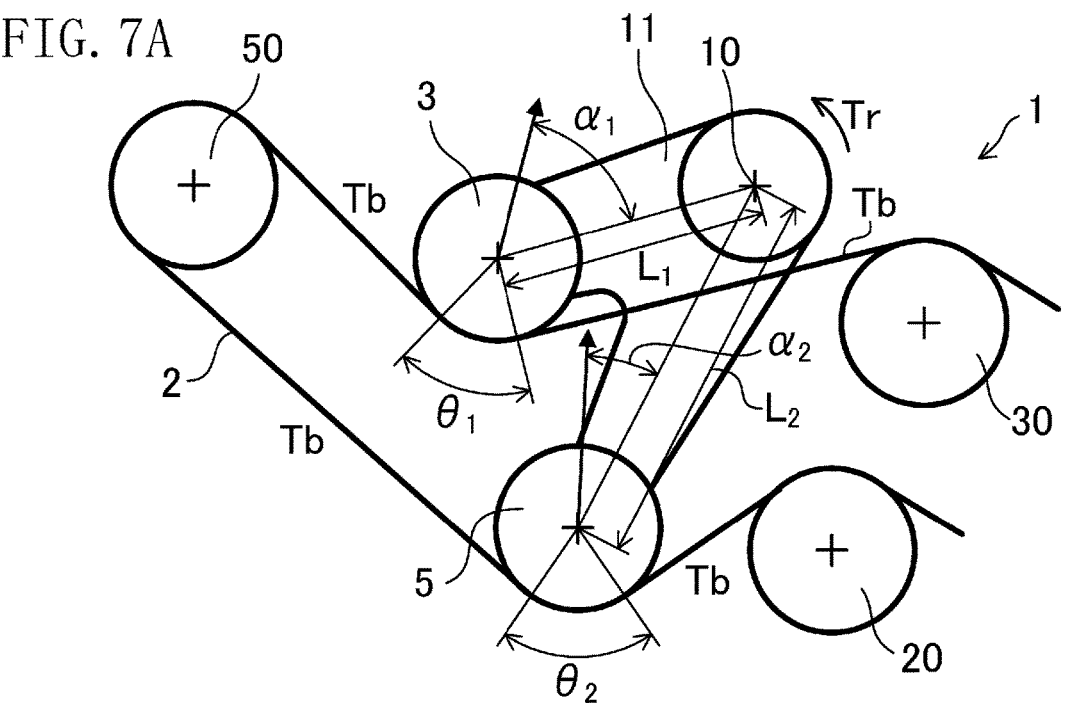
FIGS. 7A and 7B illustrate various kinds of force applied in the case where an automatic tensioner according to an embodiment is used for a belt transmission system.
Figure 7B:
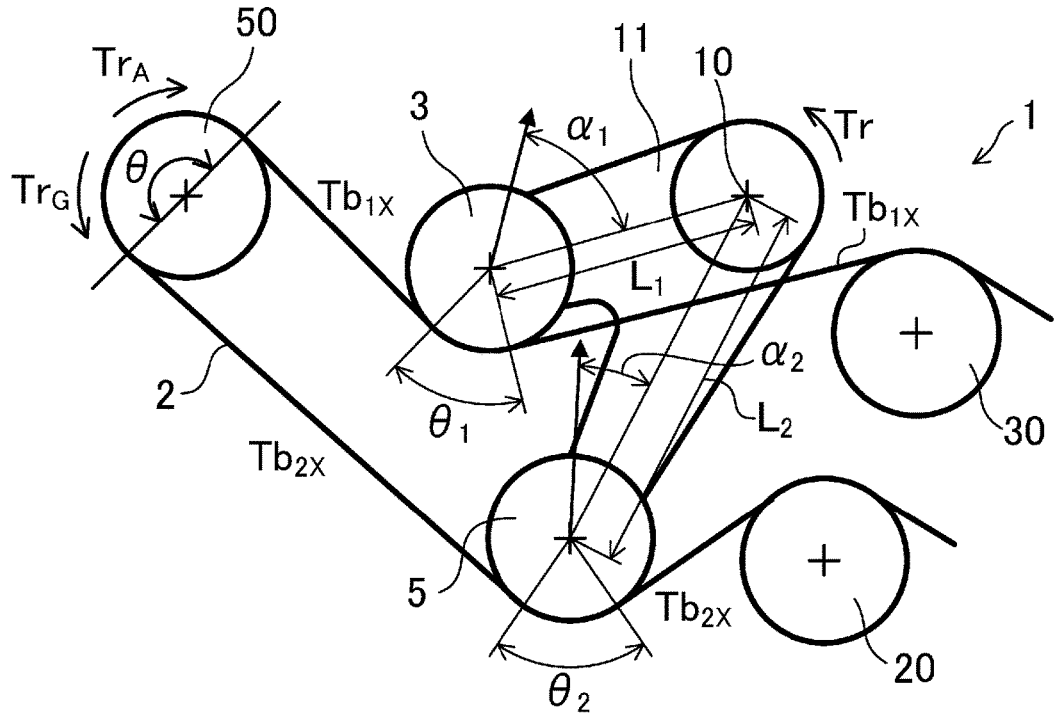

FIG. 6 illustrates various kinds of force applied in the case where a typical automatic tensioner is used for a belt transmission system. FIGS. 7A and 7B illustrate various kinds of force applied in the case where an automatic tensioner 1 according to an embodiment is used for a belt transmission system. FIG. 7A illustrates force applied while the automatic tensioner stops. FIG. 7B illustrates force applied while the automatic tensioner operates.

The automatic tensioner 1 according to this embodiment includes two tension pulleys 3 and 5. The T/S ratio described above can be changed as appropriate. A change in the T/S ratio changes the sensitivity of the tension with respect to the torque, and the relation between the pulley torque and the span tension of the belt 2 represented by the torque span-tension diagram (see FIG. 8, which will be described later). The belt transmission system taking the T/S ratio into consideration and a method of designing the system will now be described.

As shown in FIG. 6, in the case where a typical automatic tensioner 101 including a single tension pulley 26 is provided between two pulleys 30 and 50, the following equations are obtained:

Hub Load $P=2\times Tb\times\sin(\theta/2)$

Moment Arm Length $m=L\times\sin(\alpha)$ $Tr=P\times m=2\times Tb\times L\times\sin(\theta/2)\times\sin(\alpha)$ In the above equations, L is the length of the arm (mm) from the center 100 of swing of the arm to the central position of the tension pulley 26, and Tb is the tension (N) of the belt 2 between the pulley 30 and the tension pulley 26, and between the pulley 50 and the tension pulley 26. $\theta$ is the wrapping angle of the belt 2 around the tension pulley 26, and $\alpha$ is the angle between the input angle line from the belt 2 to the tension pulley 26 and the line passing through the center 100 of swing of the arm. Tr is the torque generated at the center 100 of swing of the arm.

By contrast, as shown in FIG. 7A, according to this embodiment, the first tension pulley 5 of the automatic tensioner 1 is located between the pulleys 50 and 20, and the second tension pulley 3 is located between the pulleys 50 and 30. In this case, while the belt transmission system stops, the torque Tr generated at the center 10 of swing of the arm 11 is expressed by the following equation (1).

$Tr=2\times Tb\times[L_1\times\sin(\theta_1/2)\times\sin(\alpha_1)+L_2\times\sin(\theta_2/2)\times\sin(\alpha_2)]$ (1)

As shown in FIG. 7B, assume that the belt transmission system including the automatic tensioner 1 according to this embodiment operates, and the belt 2 rotates clockwise. If the pulley 50 is a driving pulley, a clockwise torque (reverse torque) $Tr_A$ occurs at the pulley 50. If the pulley 50 is a driven pulley, a counterclockwise torque (forward torque) $Tr_G$ occurs. If the pulley 50 is the generator/starter pulley 7, $Tr_A$ is greater than $Tr_G$. This is because, in a generator/starter system of a usual internal-combustion engine, the maximum torque occurs at the generator/starter pulley 7 at the start of the starter.

The value $Tb_{1A}$ of the belt tension $Tb_1$ (i.e., the required tension) between the pulley 50 and the second tension pulley 3 and the value $Tb_{2A}$ of the belt tension $Tb_2$ between the pulley 50 and the first tension pulley 5 at the maximum $Tr_A$ are calculated. The value $Tb_{1G}$ of the belt tension $Tb_1$ between the pulley 50 and the second tension pulley 3 and the value of $Tb_{2G}$ of the belt tension $Tb_2$ (i.e., the required tension) between the pulley 50 and the first tension pulley 5 at the maximum $Tr_G$ are calculated. $Tr_A$ and $Tr_G$ are the values required in the layout, which is actually designed.

Euler's formula $Tt/Ts \leq e^{\mu'\theta}$ can be used to calculate the required tension in each case. In this formula, Tt is the tension of the belt 2 on the tight side, Ts is the tension of the belt 2 on the slack side, $\mu'$ is the apparent coefficient of friction between the belt 2 and the pulley 50, and $\theta$ is the wrapping angle of the belt around the pulley 50.

Specifically, the tension Ts on the slack side is calculated using Euler's formula, and the tension Tt on the tight side is calculated by adding an effective tension to Ts.

$Tr_A:Tb_{2A}/Tb_{1A}=e^{\mu'\theta}$ (2)

$Tb_{2A}=Tb_{1A}+Tr_{A/R}$ (3)

R is here the radius of the pulley 50.

The required tension $Tb_{1A}$ of the belt between the pulley 50 and the second tension pulley 3 is obtained by the following equation.

$Tb_{1A}=Tr_A/R(e^{\mu'\theta}-1)$ (4)

$Tr_G:Tb_{1G}/Tb_{2G}=e^{\mu'\theta}$ (5)

$Tb_{1G}=Tb_{2G}+Tr_G/R$ (6)

The required tension $Tb_{2G}$ of the belt between the pulley 50 and the first tension pulley 5 is obtained by the following equation.

$Tb_{2G}=Tr_G/R(e^{\mu'\theta}-1)$ (7)

The range in which no slip of the belt 2 occurs may be obtained by dynamic analysis as necessary.

Figure 8:
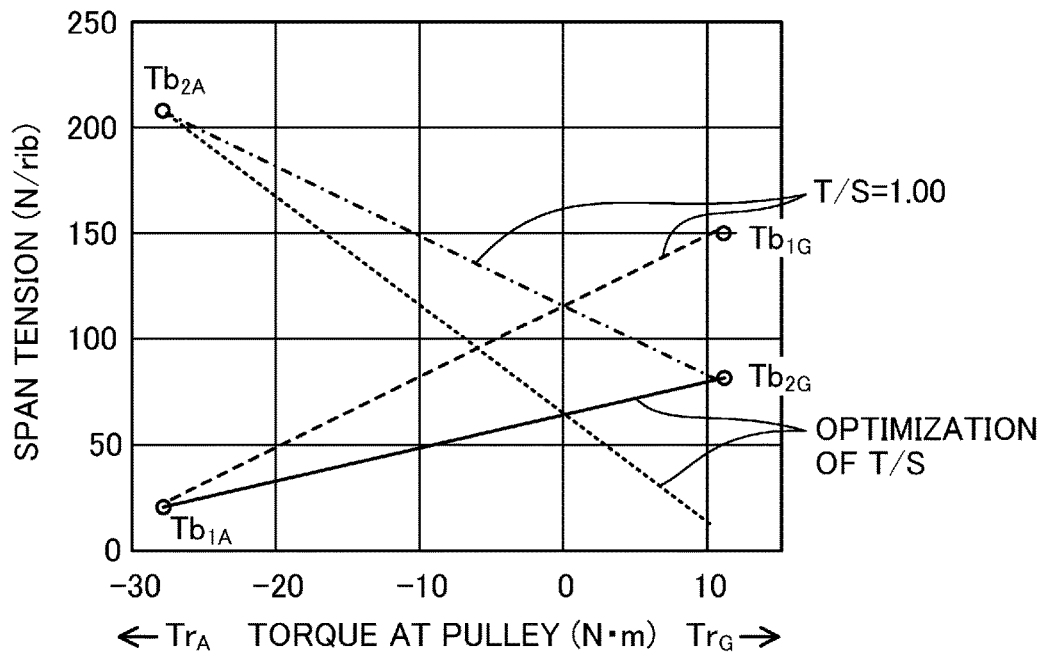
FIG. 8 illustrates the relation between a belt tension (span tension) per belt rib and the torque at a pulley where the T/S ratio is optimized and where the T/S ratio is 1.00 in a belt transmission system with the layout of FIG. 7B.

Next, as shown in Table 1, the ratio of the absolute value (i.e., $\Delta Tb_1$) obtained by $Tb_{1A}-Tb_{1G}$ to the absolute value (i.e., $\Delta Tb_2$) obtained by $Tb_{2A}-Tb_{2G}$, that is, the T/S ratio ($=\Delta Tb_2/\Delta Tb_1$, also simply referred to as "T/S," for example, in FIG. 8) is obtained. In this procedure, the optimum T/S ratio can be obtained. Alternatively, the optimum T/S ratio may be obtained by division using the greater one of the absolute values of the differences $Tb_{2A}-Tb_{2G}$ and $Tb_{1A}-Tb_{1G}$ as the numerator, and the smaller one as the denominator.

TABLE 1

|  | Required Tension $Tr_A$ | Required Tension $Tr_G$ | $\Delta Tb_x =$ $\|Tb_{xA} - Tb_{xG}\|$ | T/S Ratio |
|---|---|---|---|---|
| $Tb_1$ | $Tb_{1A}$ | $Tb_{1G}$ | $\Delta Tb_1$ | $\Delta Tb_2/\Delta Tb_1$ |
| $Tb_2$ | $Tb_{2A}$ | $Tb_{2G}$ | $\Delta Tb_2$ | |

If there are a plurality of driving and driven pulleys, the required tensions for all the pulleys are calculated and the highest tension may be used as the required tension for obtaining the T/S ratio. As a result, slips of the belt 2 and abnormal noise at all the pulleys can be reduced efficiently.

For example, in the example shown in FIGS. 7A and 7B, with respect to the pulleys 20 and 30 like the pulley 50, the tension Tt of the belt 2 on the tight side and the tension Ts on the slack side are obtained using Euler's formula. Next, the tensions on the slack side at the maximum forward torque generated at the pulley 20 and at the maximum reverse torque generated at the pulley 30 are calculated as the respective required tensions.

Then, the optimum T/S ratio is calculated using the highest one of the required tensions at the pulleys at the maximum forward torque and at the maximum reverse torque.

Where $Tr_A$ is greater than $Tr_G$, the T/S ratio described above can be obtained by the following equation (8):

T/S ratio$=\{L_1\times\sin(\theta_1/2)\times\sin(\alpha_1)\}/\{L_2\times\sin(\theta_2/2)\times\sin(\alpha_2)\}$ (8)

In the equation (8), $L_1$ is the length (i.e., the first length) of the arm 11 from the center 10 of swing to the central position of the second tension pulley 3, $\theta_1$ is the wrapping angle of the belt around the second tension pulley 3, and $\alpha_1$ is the hub load angle at the second tension pulley 3. On the other hand, $L_2$ is the length (i.e., the second length) of the arm 11 from the center 10 of swing to the central position of the first tension pulley 5, $\theta_2$ is the wrapping angle of the belt around the first tension pulley 5, and $\alpha_2$ is the hub load angle at the first tension pulley 5.

As shown in the equation (8), the T/S ratio is determined by the values $L_1$, $\theta_1$, $\alpha_1$, $L_2$, $\theta_2$ and $\alpha_2$. Thus, if the belt transmission system including the automatic tensioner 1 is designed such that the T/S ratio is close to the optimum value obtained first, excessive tensions applied to the belt 2 can be reduced.

The present inventors actually calculated the optimum T/S ratio in the belt transmission system in which the belt is wrapped around the pulley (i.e., the driven pulley) 50 and the driving pulley and runs between the pulleys.

Figure 9:
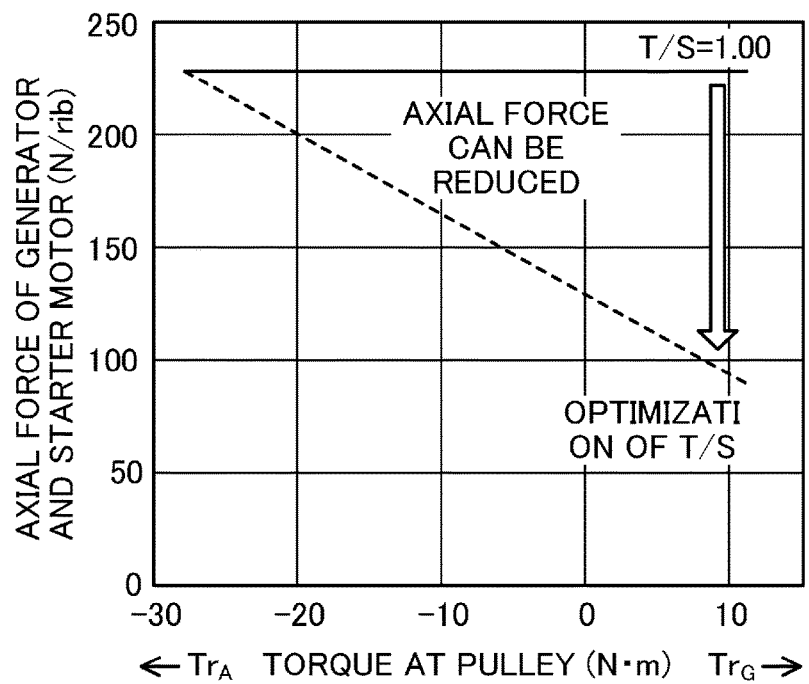
FIG. 9 illustrates the relation between the sum of the tensions on the tight and slack sides of a belt per belt rib and the torque at a pulley 50.

FIG. 8 illustrates the relation between a tension (i.e., a span tension) of a belt per belt rib and the torque generated at the pulley 50 where the T/S ratio is optimized and where the T/S ratio is 1.00 in a belt transmission system with the layout shown in Table 2 and FIGS. 11A and 11B, which will be described later. FIG. 9 illustrates the relation between the sum of the tensions of the belt on the tight and slack sides per belt rib (i.e., the axial force of the generator and the starter motor) and the torque at the pulley 50. Table 2 represents the layout of the belt transmission system and the calculation results such as the required tensions and the T/S ratio. FIGS. 8 and 9 illustrate the theoretical values (i.e., optimum values) calculated under the conditions shown in Table 2.

Figure 10A:
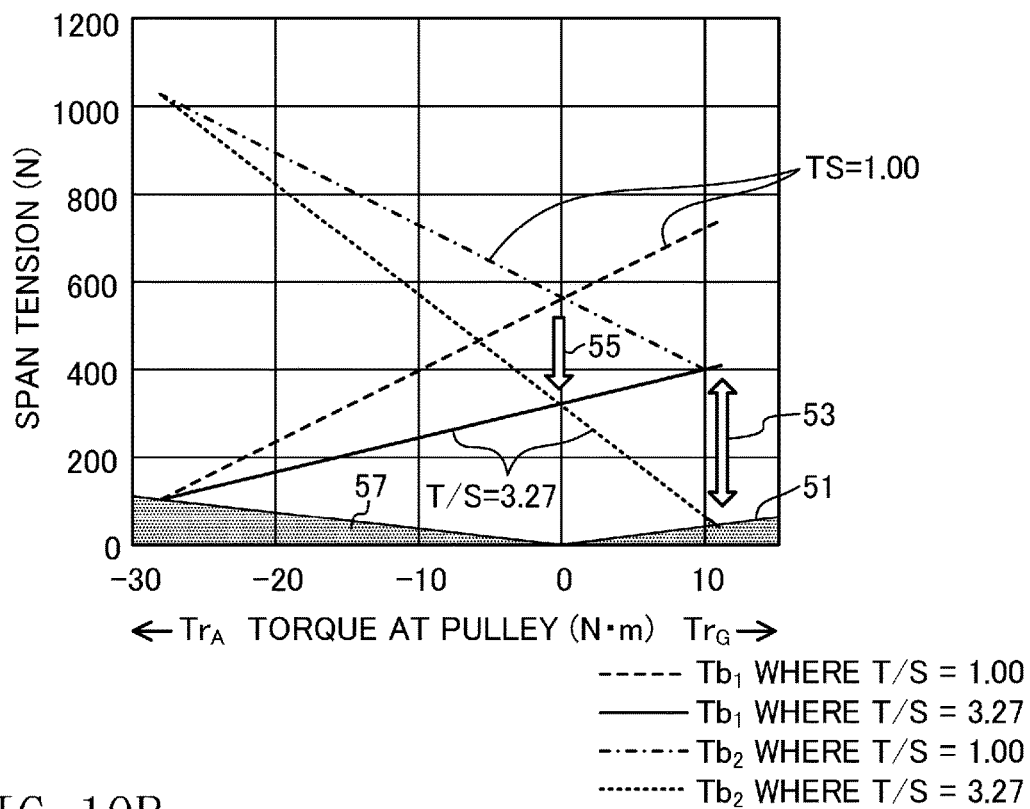
FIG. 10A illustrates a simulation result of the relation between a belt tension $Tb_1$ and the torque at the pulley 50, and between a belt tension $Tb_2$ and the torque at the pulley 50 where the T/S ratio is 1.00 and 3.27. The belt tension $Tb_1$ is generated between the pulley 50 and a second tension pulley 3. The belt tension Tb$_2$ is generated between the pulley 50 and a first tension pulley.
Figure 10B:
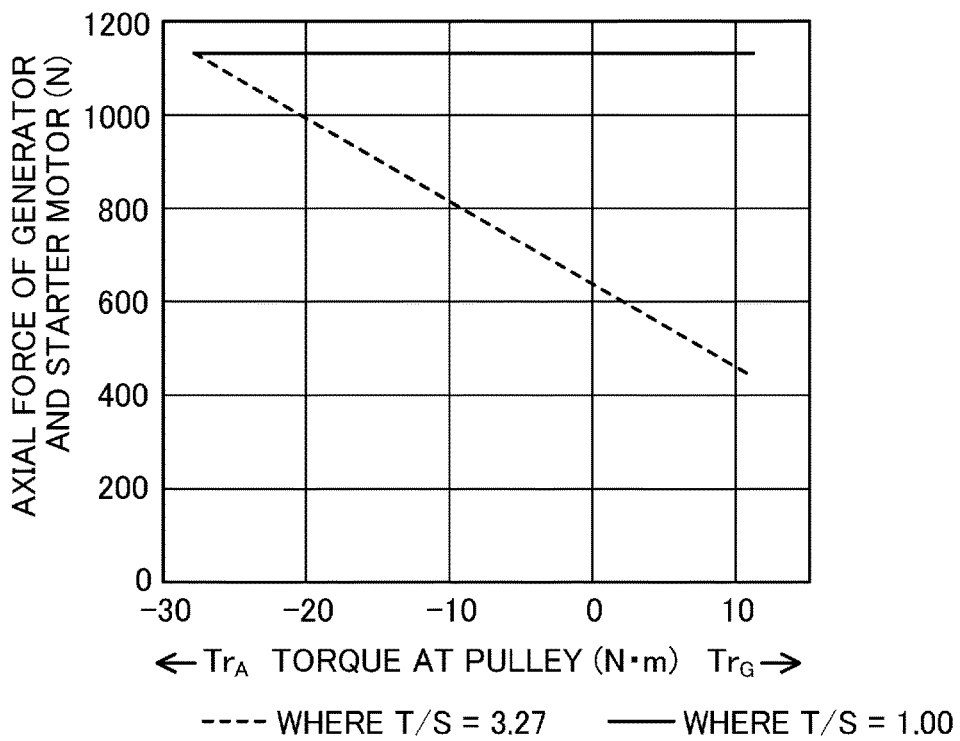
FIG. 10B illustrates the relation between the sum of the tensions on the tight and slack sides of the belt and the torque at the pulley 50.

FIG. 10A illustrates a simulation result of the relation between a belt tension Tb and the torque at the pulley 50, and between a belt tension $Tb_2$ and the torque at the pulley 50 where the T/S ratio is 1.00 and 3.27. The belt tension $Tb_1$ is generated between the pulley 50 and the second tension pulley 3. The belt tension $Tb_2$ is generated between the pulley 50 and the first tension pulley 5. FIG. 10B illustrates the relation between the sum of the tensions of the belt on the tight and slack sides and the torque at the pulley 50. FIGS. 8, 9, 10A, and 10B illustrate the same simulation results although the units in the vertical axes are different.

At $Tr_G$ of 11 (N·m), the required tension $Tb_{2G}$ of the belt 2 between the pulley 50 and the first tension pulley 5 was 40.4 (N·m), and $Tb_{1G}$ of the belt 2 between the pulley 50 and the second tension pulley 3 was 407.0 (N·m).

As a result, as shown in Table 2, $\Delta Tb_1$ was 304.2(N·m), $\Delta Tb_2$ was 995.7 (N·m), and the optimum T/S ratio was calculated as 3.27.

The following are found from FIGS. 8 and 10A. The tension $Tb_1$ of the belt 2 between the pulley 50 and the second tension pulley 3 linearly increases, as $Tr_A$ decreases and $Tr_G$ increases. The optimization of the T/S ratio largely reduces the tension $Tb_1$ within a required range, as compared to the case where T/S is, for example, 1.00. On the other hand, the tension $Tb_2$ of the belt 2 between the pulley 50 and the first tension pulley 5 linearly decreases, as $Tr_A$ decreases and $Tr_G$ increases. The optimization of the T/S ratio largely reduces the tension $Tb_2$, as compared to the case where T/S is 1.00.

The following are found from FIGS. 9 and 10B. In the case where the T/S ratio is 1.00, the force applied to the axis of the pulley 50 (i.e., the sum of $Tb_1$ and $Tb_2$) is constant. On the other hand, in the case where the T/S ratio is optimized, the force applied to the axis of the pulley 50 decreases as $Tr_A$ decreases and $Tr_G$ increases.

Therefore, by setting the T/S ratio to be 1.00 or higher, more preferably, closer to the optimum value, the tension of the belt can be reduced to the necessary and sufficient extent and the lift time of the belt can be extended. In addition, the force applied to the axis of the pulley can be reduced and the lifetime of the pulley can be extended.

Figure 11A:
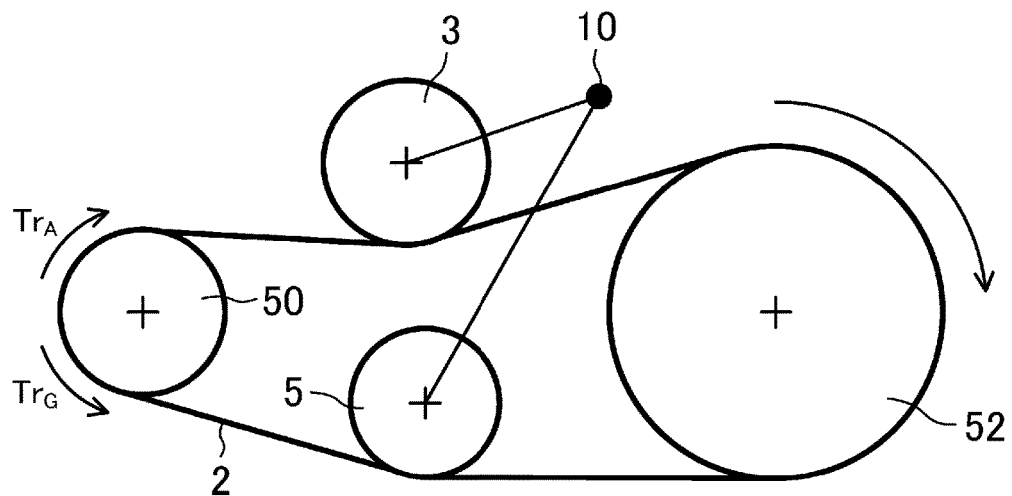
FIG. 11A illustrates the layout of a belt transmission system including the automatic tensioner according to the embodiment where the T/S ratio is 1.0.

FIG. 11A illustrates the layout of a belt transmission system including the automatic tensioner 1 according to the embodiment where the T/S ratio is 1.0. FIG. 11B illustrates the layout of the belt transmission system including the automatic tensioner 1 according to the embodiment where the T/S ratio is 3.27. The belt transmission system shown in FIGS. 11A and 11B includes the belt 2 wrapped around the pulley (i.e., the driven pulley) 50 and the driving pulley 52 and running therebetween, and the automatic tensioner 1.

Figure 11B:
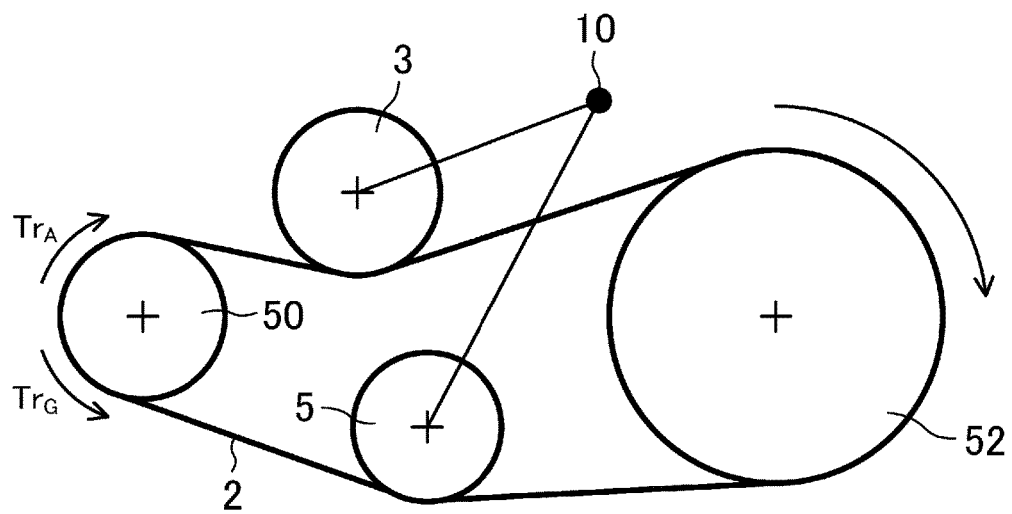
FIG. 11B illustrates the layout of the belt transmission system including the automatic tensioner according to the embodiment where the T/S ratio is 3.27.

The automatic tensioner 1 shown in FIG. 11A differs from the automatic tensioner 1 shown in FIG. 11B in the wrapping angles of the belt around, and the hub load angles and the lengths of the arms at the first tension pulley 5 and the second tension pulley 3.

TABLE 2

| Layout | | | | | Required Tension | | | | $\Delta T_{bx} =$ | |
| --- | --- | --- | --- | --- | --- | --- | --- | --- | --- | --- |
| Number of Belt Ribs | Diameter of Pulley D | Wrapping Angle $\theta$ | $Tr_A$ | $Tr_G$ | $Tr_A =$ 28N·m | | $Tr_G =$ 28N·m | | $\|Tb_{xA} - Tb_{xG}\|$ | T/S Ratio |
| | | | | | $Tb_{1A}$ | $Tb_{2A}$ | $Tb_{1G}$ | $Tb_{2G}$ | $\Delta Tb_1$ $\Delta Tb_2$ | |
| 5 | 60 mm | 180 degrees | 28N·m | 11N·m | 102.8 | 1036.1 | 407.0 | 40.4 | 304.2 995.7 | 3.27 |

As shown in Table 2, in this experiment, the number of belt ribs (i.e., the belt width) was 5 (i.e., 17.8 mm), the diameter of the pulley 50 was 60 mm, and the wrapping angle of the belt around the pulley 50 was 180 degrees. The maximum driving torque $Tr_A$ was set to 28 (N·m), and the maximum driven torque $Tr_G$ was set to 11 (N·m). At $Tr_A$ of 28 (N·m), the required tension $Tb_{1A}$ of the belt 2 between the pulley 50 and the second tension pulley 3 was 102.8 (N·m), and $Tb_{2A}$ the belt 2 between the pulley 50 and the first tension pulley 5 was 1036.1 (N·m).

As shown in FIG. 10A, the following are acknowledged in the case where the T/S ratio is 3.27, which is the optimum value obtained in the calculation described above, different from the case where the T/S ratio is 1.00. Where no torque occurs at the pulley 50, a tension reducing effect 55 of about 248 (N) was obtained. Where the driven torque $Tr_G$ of 11 (N) occurs at the pulley 50, a tension reducing effect 53 of about 346 (N) was obtained between the pulley 50 and the second tension pulley 3. It was also acknowledged that, at the T/S ratio of 3.27, the tension of the belt 2 is close to a minimum required tension 51 out of a slip region 57 in both the cases where the driving torque $Tr_A$ is the maximum and where the driven torque $Tr_G$ is the maximum.

In designing the belt transmission system according to this embodiment, the T/S ratio is optimized as much as possible in one preferred embodiment. However, if the T/S ratio cannot be the optimum value due to the layout conditions, the torque of the one of the first and second tension pulleys 5 and 3, which is located on the slack side at a maximum torque, may be greater than the torque of the other tension pulley, which is located on the tight side. As a result, excessive tensions applied to the belt 2 can be reduced.

By setting the T/S ratio to be higher than 1, excessive tensions applied to the belt 2 and the axial force of the pulley can be reduced. By setting the T/S ratio to be higher than 1 and the ratio of the T/S ratio to the optimum T/S ratio (i.e., (the T/S ratio)/(the optimum T/S ratio) within a predetermined range, the risk of slips of the belt can be efficiently reduced.

Figure 12:
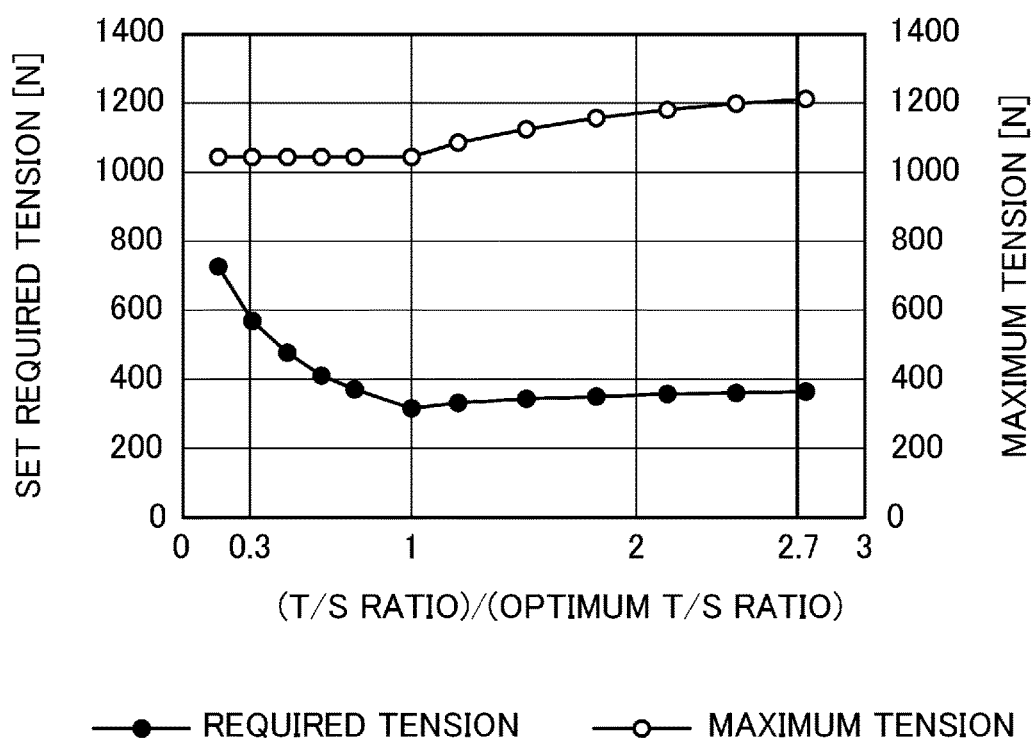
FIG. 12 illustrates the relation among the ratio of the T/S ratio to an optimum T/S ratio, the required tension of a belt, and a maximum tension in a belt transmission system.
Figure 13A:
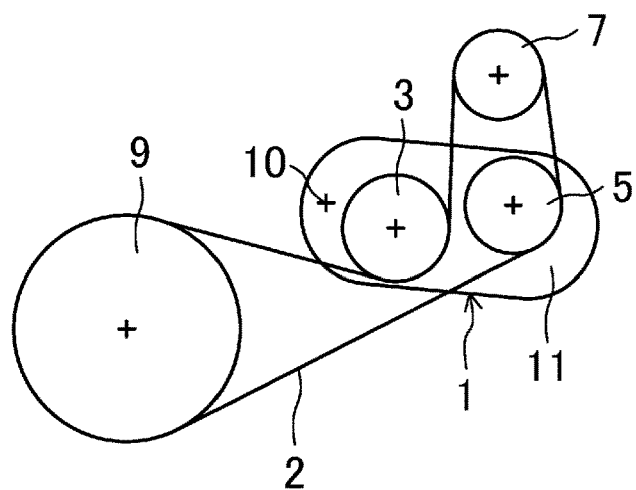
FIGS. 13A to 13C illustrate variations of the belt transmission system including the automatic tensioner according to the present disclosure.
Figure 13B:
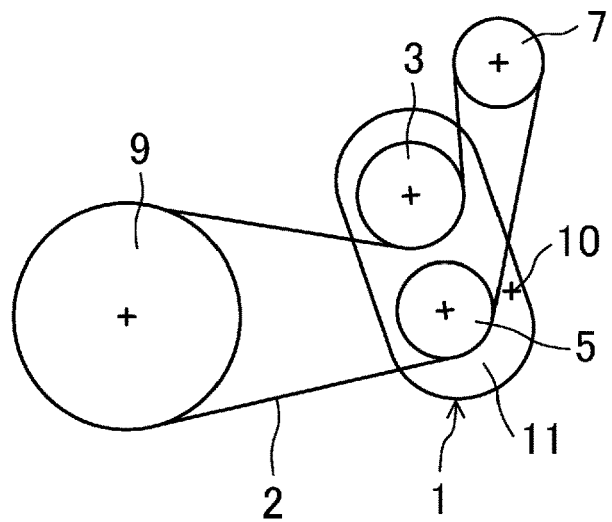
Figure 13C:
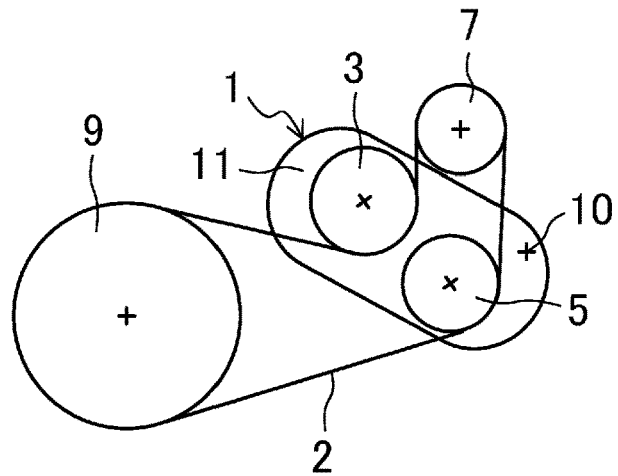

FIG. 12 illustrates the relation between the ratio of the T/S ratio to the optimum T/S ratio and the required and maximum tensions of the belt in the belt transmission system. FIG. 12 illustrates the results when the T/S ratio are changed under the conditions shown in FIG. 10.

It is found from the results shown in FIG. 12 that the value of (T/S ratio)/(optimum T/S ratio) falls within a range from 0.3 to 2.7 in one preferred embodiment.

If the value of (T/S ratio)/(optimum T/S ratio) is lower than 0.3, the required tension is twice or more as high as the optimum T/S ratio, and the tension reducing effect decreases rapidly. It is preferable that the belt transmission system be designed so that the value of (T/S ratio)/(optimum T/S ratio) is 0.3 or higher, after the optimum T/S ratio has been calculated by the method described above.

In general, the belt 2 used for a belt transmission system has 5 or 6 ribs. If the value of (T/S ratio)/(optimum T/S ratio) is higher than 2.7, the tension of the belt 2 on the tight side increases, which requires more ribs of the belt 2. Thus, the value of (T/S ratio)/(optimum T/S ratio) is preferably 2.7 or lower.

In the belt transmission system according to this embodiment described above, the start-up requirement of the starter motor is the strictest among the operation requirements. Therefore, the layout of the belt transmission system preferably meets the start-up conditions of the starter motor.

For example, in an initial state, the torque applied to the second tension pulley 3 is preferably higher than the torque applied to the first tension pulley 5. In order to optimize the T/S ratio, the pulley closer to the center 10 of swing of the arm 11 may be the first tension pulley 5 and the pulley farther from the center 10 of swing of the arm 11 may be the second tension pulley 3.

The wrapping angle of the belt 2 around the second tension pulley 3 may be greater than the wrapping angle of the belt 2 around the first tension pulley 5. If the angle between the input angle line from the belt 2 to the tension pulley and the line passing through the center 10 of swing of the arm 11 is referred to as a "hub load angle" (HLA; i.e., the hub load angle δ described above), HLA at the first tension pulley 5 may be farther from 90 degrees than HLA at the second tension pulley 3.

As long as the belt transmission system according to this embodiment is designed in view of the T/S ratio, the layout is not particularly limited. The T/S ratio is preferably, for example, higher than 1 and lower than or equal to the optimum value obtained by the calculation. For example, two tension pulleys 3 and 5 provided for a the single automatic tensioner 1 may apply tensions to the tight and slack sides of the belt 2, and the first and second tension pulleys 5 and 3 may turn in the same direction due to the force received from the belt 2. Furthermore, when the first tension pulley 5 turns in the direction in which the tension of the belt 2 increases, the second tension pulley 3 may also turn in this direction. This configuration facilitates the optimization of the T/S ratio in the automatic tensioner 1, and is thus preferable.

In the belt transmission system according to this embodiment, in both the case where the generator/starter pulley 7 serves as a driving pulley and the crank pulley 9 serves as a driven pulley, and where the generator/starter pulley 7 serves as a driven pulley and the crank pulley 9 serves as a driving pulley, the T/S ratio can be set so that the arm 11 swings in a smaller range. As compared to the belt transmission system described in, for example, Patent Documents 2 and 3, the arm 11 swings in a smaller range and the durability increases in the belt transmission system according to this embodiment.

In the example shown in FIG. 1, the inner circumferential surface of the belt 2 is wrapped around the first tension pulley 5, and the back surface of the belt 2 is wrapped around the second tension pulley. How to wrap the belt 2 is not limited thereto. For example, an idler pulley(s) may be added as appropriate so that one of the surfaces of the belt 2 are wrapped around both the first and second tension pulleys 5 and 3.

In the belt transmission system according to this embodiment, the rotation direction 18 of the belt 2 may be clockwise or counterclockwise. As long as the optimum T/S ratio is obtained based on the magnitudes of $Tr_A$ and $Tr_G$, similar advantages can be obtained regardless of the rotation direction of the belt. The automatic tensioner 1 according to this embodiment may be used for a belt transmission system in which the rotation direction 18 of the belt 2 is switchable between the forward and reverse directions. Variations of the belt transmission system according to this embodiment are collectively described below.

Variations of Belt Transmission System

FIGS. 13A to 13C and 14A to 14C illustrate variations of the belt transmission system including the automatic tensioner according to the present disclosure. In FIGS. 13A to 13C and 14A to 14C, the center of the cylindrical part (i.e., the spindle) 16 of the fixed member 13 agrees with the center 10 of swing of the arm. In examples according to these variations, the belt 2 rotates clockwise at the start of the engine and during the operation.

Figure 14A:
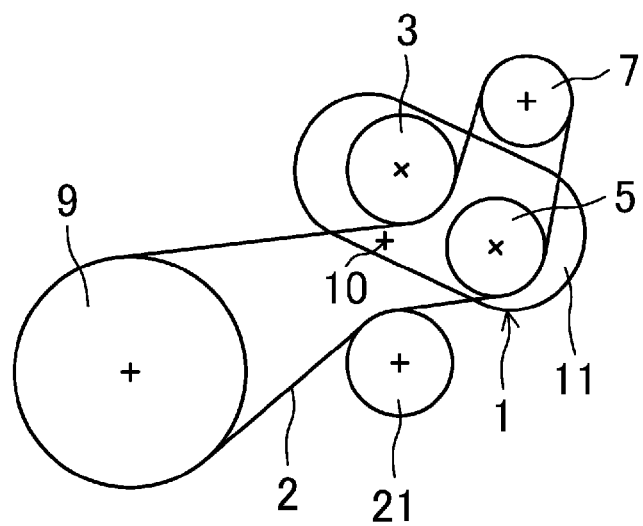
FIGS. 14A to 14C illustrate variations of the belt transmission system including the automatic tensioner according to the present disclosure.
Figure 14B:
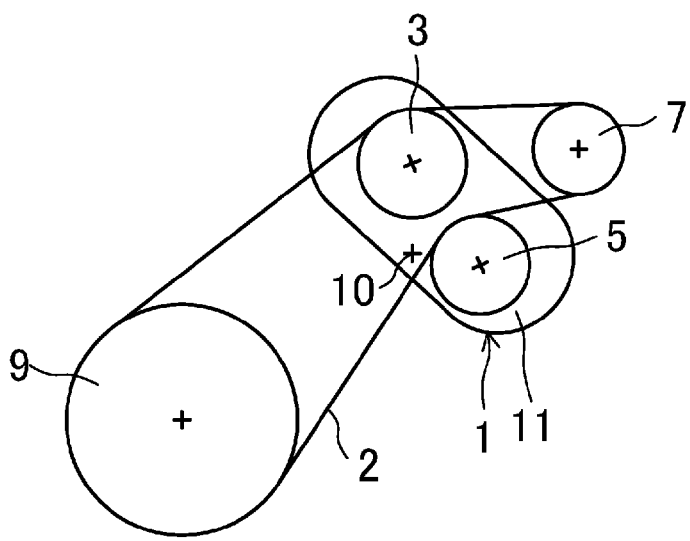
Figure 14C:
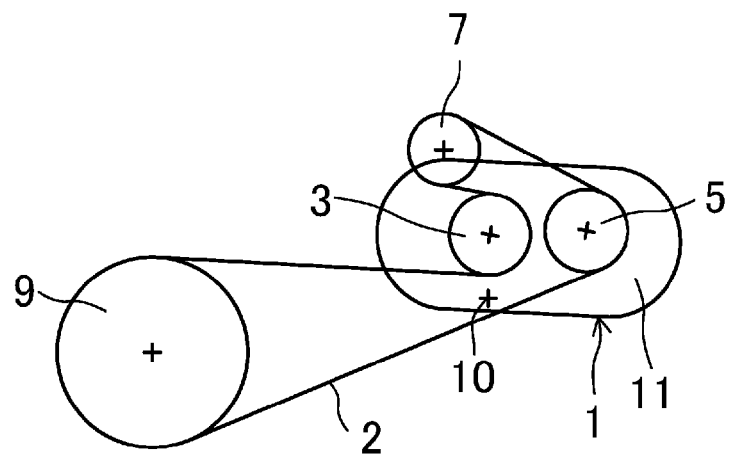

As shown in FIGS. 13A to 13C, 14B, and 14C, the wrapping angle of the belt 2 around the first or second tension pulley 5 or 3 and the locations of the pulleys may be changed from those in the example of FIG. 1. As shown in FIG. 14A, other pulleys such as an idler pulley 21 may be added to the belt transmission system as appropriate.

Figure 15A:
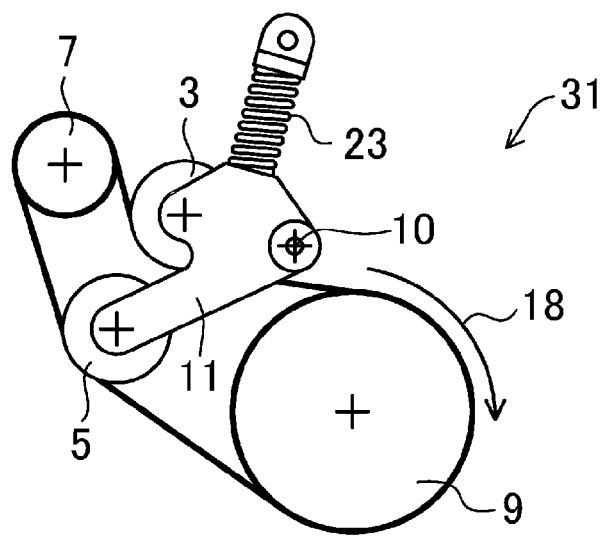
FIGS. 15A to 15C illustrate variations of the belt transmission system including the automatic tensioner according to the present disclosure.
Figure 15B:
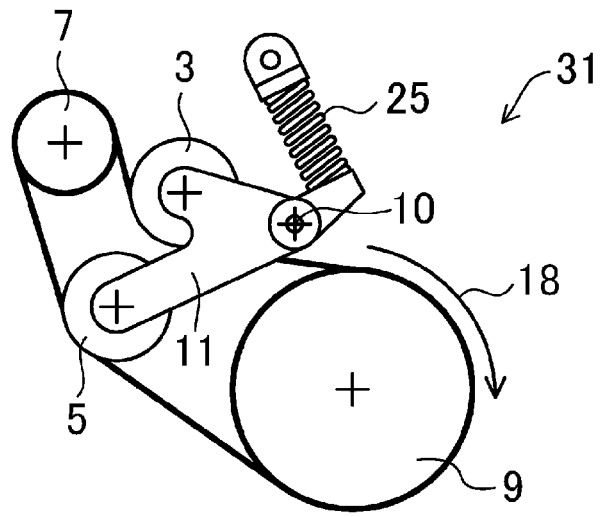

FIGS. 15A to 15 C, 16A, 16B, 17A, and 17B illustrate variations of the belt transmission system including the automatic tensioner according to the present disclosure.

Figure 15C:
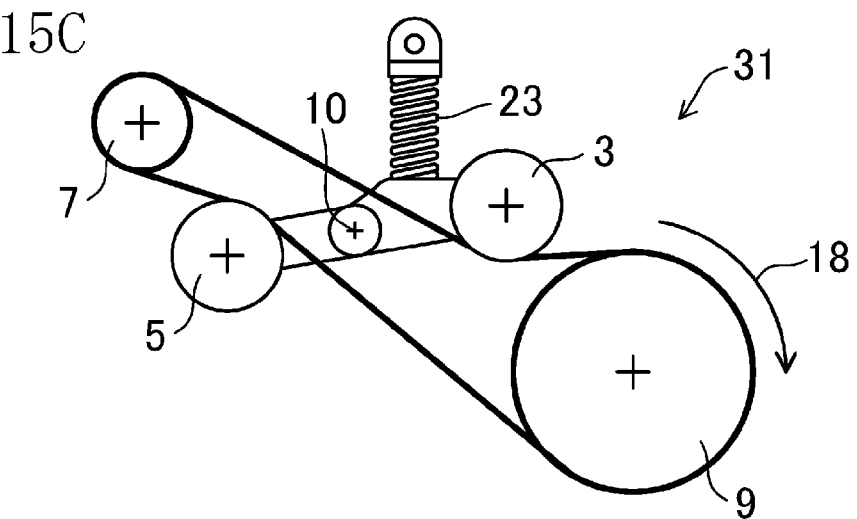

Each of automatic tensioners 31 shown in FIGS. 15A and 15C includes a compression spring 23 instead of the helical torsion spring 15. One end of the compression spring 23 is fixed, and the other end is connected to the arm 11. An automatic tensioner 31 shown in FIG. 15B includes an extension spring 25. One end of the extension spring 25 is fixed, and the other end is connected to the arm 11. In these automatic tensioners 31, when the arm 11 receives force from the belt 2, the compression spring 23 or the extension spring 25 applies biasing force to the arm 11. In these belt transmission systems, the rotation direction 18 of the belt 2 may be clockwise, counterclockwise in FIGS. 15A to 15C, or switchable between forward and reverse directions. This applies to other variations of the belt transmission system. The belt transmission system in which the rotation direction of the belt 2 is switchable is preferably used for, for example, a plate compactor.

As shown in FIG. 15C, both the first and second tension pulleys 5 and 3 may be in contact with the outer circumferential surface of the belt.

Figure 16A:
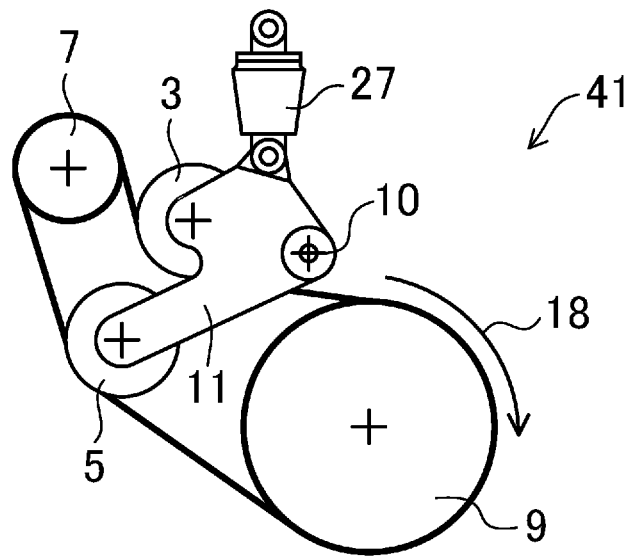
FIGS. 16A and 16B illustrate variations of the belt transmission system including the automatic tensioner according to the present disclosure.

Like an automatic tensioner 41 shown in FIG. 16A, the tensioner may be a hydraulic tensioner in which the compression spring 23 shown in FIG. 15A is replaced with a hydraulic damper 27 and the first and second tension pulleys 5 and 3 are provided for the arm 11. The hydraulic damper 27 applies proper reaction force to the arm 11 in accordance with the swing of the arm 11. Since the hydraulic damper 27 applies greater force than the spring, a hydraulic tensioner is preferably used in a case where the tension of a belt is relatively high.

Figure 16B:
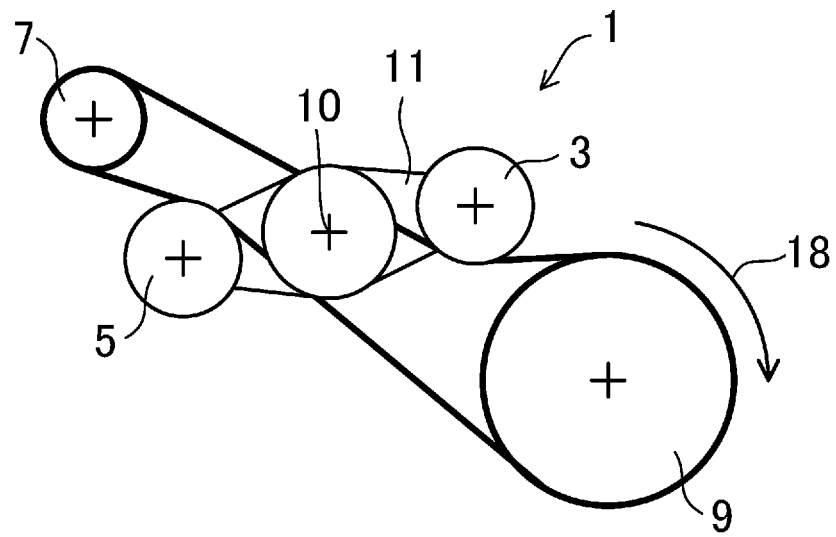

As shown in FIG. 16B, in the automatic tensioner 1 according to the embodiment shown in FIG. 1, the first and second tension pulleys 5 and 3 are located on the opposite sides of the center 10 of swing of the arm 11. In this automatic tensioner 1, both the first and second tension pulleys 5 and 3 are in contact with the outer circumferential surface of the belt 2.

Figure 17A:
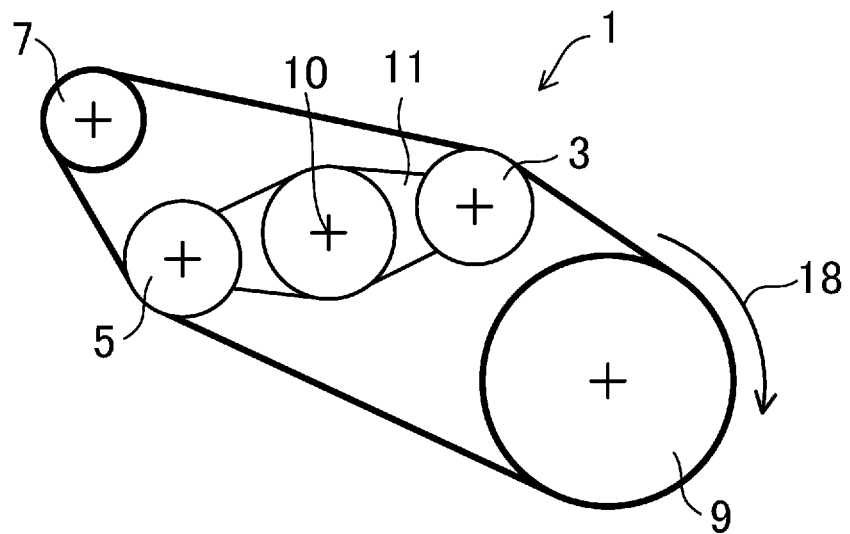
FIGS. 17A and 17B illustrate variations of the belt transmission system including the automatic tensioner according to the present disclosure.
Figure 17B:
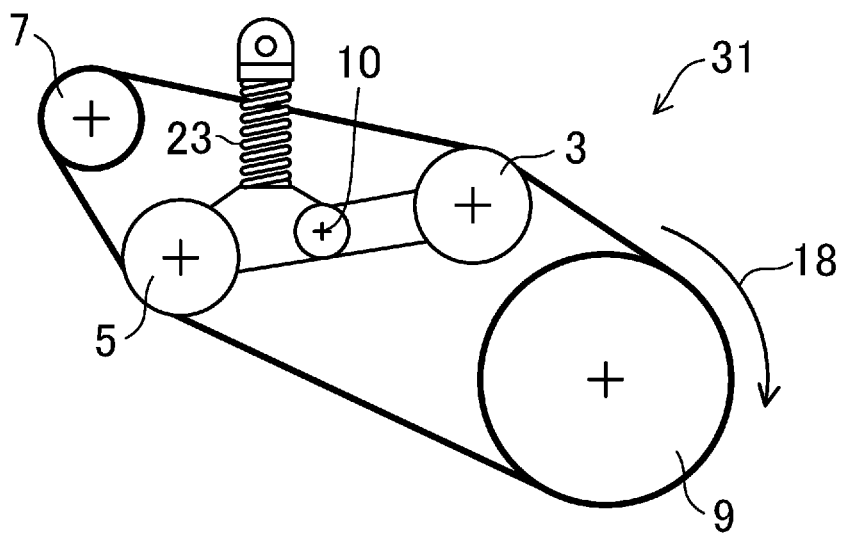

As shown in FIG. 17B, even if both the first and second tension pulleys 5 and 3 are in contact with the inner circumferential surface of the belt 2, required tensions can be applied to the belt 2.

As shown in FIG. 17B, in the automatic tensioner 31 using the compression spring 23, both the first and second tension pulleys 5 and 3 may be in contact with the inner circumferential surface of the belt 2.

In each of the variations described above, the first and second tension pulleys 5 and 3 may turn in the same direction or different directions. When the first tension pulley 5 turns in the direction in which the tension of the belt 2 increases, the second tension pulley 3 may also turn in this direction.

Although the exemplary belt transmission systems have been described above, the shapes, configurations, locations, materials, sizes and other features of the members may be changed as appropriate within the scope of the present disclosure. For example, each belt transmission system may not necessarily include an internal-combustion engine and a generator/starter motor, and may transmit power in an apparatus other than a vehicle. Tension pulleys located between two driving pulleys, which switchably serves as a driven pulley and as a driving pulley, may be supported by a common arm. Alternatively, two tension pulleys may be connected to different arms, which have a pivot in common.

The belt transmission systems according to the variations shown in FIG. 13A to 17C are preferably designed in view of the T/S ratio. Specifically, when the crank pulley 9 or the generator/starter pulley 7 serves as a driving pulley, the torque at one of the first and second tension pulleys 5 and 3 located on the slack side at the maximum torque is higher than the torque at the other tension pulley located on the tight side. In each of the variations, the tension of the belt 2 is reduced in a range out of the required tension, and the force applied to the axis of the pulley is also reduced. As a result, the lifetimes of the belt 2 and the pulleys extend and the fuel efficiency improves. Since the tensions required for the belt 2 are maintained, slips and abnormal noise are reduced.

Furthermore, in the belt transmission systems according to these variations, the T/S ratio is higher than 1, and more preferably, the value of (T/S ratio)/(optimum T/S ratio) falls within the range from 0.3 and 2.7. The setting largely reduces the tension of the belt without changing the width of the belt. In each of the cases where the crank pulley 9 is a driving pulley, and where the generator/starter pulley 7 is a driving pulley, the arm 11 swings within a small range.

The automatic tensioner according to an example of the present disclosure is applicable to, for example, various types of vehicles including an internal-combustion engine.

What is claimed is:

1. A belt transmission system comprising:
a first pulley configured to transmit first power;
a second pulley configured to transmit second power;
an endless belt wrapped around the first and second pulleys and configured to run therebetween;
an automatic tensioner including
a first tension pulley configured to apply a tension to a portion of the belt located between the first and second pulleys on a slack side of the first pulley in a normal operation,
a fixed member,
an arm located on the fixed member to be swingable about an axis of the fixed member, and
a second tension pulley configured to apply a tension to another portion of the belt located between the first and second pulleys on a tight side of the first pulley in the normal operation; wherein
one of the first and second tension pulleys located on the slack side at a maximum torque provides a greater torque than the other of the first and second tension pulleys located on the tight side, when the first or second pulley serves as a driving pulley.

2. The belt transmission system of claim 1, wherein a T/S ratio obtained by an expression $\{L_1 \times \sin(\theta_1/2) \times \sin(\alpha_1)\}/\{L_2 \times \sin(\theta_2/2) \times \sin(\alpha_2)\}$ is higher than 1 where
a first length of the arm at the second tension pulley is $L_1$,
a wrapping angle of the belt around the second tension pulley is $\theta_1$,
a hub load angle at the second tension pulley is $\alpha_1$,
a second length of the arm at the first tension pulley is $L_2$,
the wrapping angle of the belt around the first tension pulley is $\theta_2$,
the hub load angle at the first tension pulley is $\alpha_2$, and
the second tension pulley is located on the slack side at the maximum torque.

3. The belt transmission system of claim 2, wherein a ratio of the T/S ratio to an optimum T/S ratio according to calculation falls within a predetermined range, and
the optimum T/S ratio is calculated using higher one of required tensions of the first and second pulleys located on the slack side of the belt at a maximum forward torque, and higher one of required tensions of the first and second pulleys located on the slack side of the belt at a maximum reverse torque.

4. The belt transmission system of claim 2, wherein the optimum T/S ratio is obtained by using greater one of absolute values of differences $Tb_{2A}-Tb_{2G}$ and $Tb_{1A}-Tb_{1G}$ as a numerator and smaller one as a denominator, where
a forward torque generated at the first pulley is $Tr_G$,
a reverse torque generated at the first pulley is $Tr_A$,
a required tension of the belt between the first pulley and the second tension pulley at a maximum $Tr_A$ is $Tb_{1A}$,
a tension of the belt between the first pulley and the first tension pulley at the maximum $Tr_A$ is $Tb_{2A}$, a tension of the belt between the first pulley and the second tension pulley at a maximum $Tr_G$ is $Tb_{1G}$, and a required tension of the belt between the first pulley and the first tension pulley at the maximum $Tr_G$ is $Tb_{2G}$.

5. The belt transmission system of claim 2, wherein the ratio of the T/S ratio to the optimum T/S ratio falls within a range from 0.3 to 2.7.

6. The belt transmission system of claim 1, wherein the second tension pulley is supported on the arm.

* * * * *